(12) United States Patent
Satake et al.

(10) Patent No.: US 10,418,821 B2
(45) Date of Patent: Sep. 17, 2019

(54) POWER CONVERTING APPARATUS AND POWER CONVERTING METHOD

(71) Applicant: KYOCERA Corporation, Kyoto-shi, Kyoto (JP)

(72) Inventors: Masaomi Satake, Yokohama (JP); Masahiro Baba, Kawasaki (JP); Yuri Sato, Kawasaki (JP); Kenta Igarashi, Yokohama (JP); Megumi Kuwabara, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 134 days.

(21) Appl. No.: 15/553,549

(22) PCT Filed: Feb. 25, 2016

(86) PCT No.: PCT/JP2016/055702
§ 371 (c)(1),
(2) Date: Aug. 24, 2017

(87) PCT Pub. No.: WO2016/136911
PCT Pub. Date: Sep. 1, 2016

(65) Prior Publication Data
US 2018/0041039 A1 Feb. 8, 2018

(30) Foreign Application Priority Data

Feb. 25, 2015 (JP) ................................ 2015-035910
Feb. 25, 2015 (JP) ................................ 2015-035914

(51) Int. Cl.
*H02J 3/38* (2006.01)
*H02J 7/35* (2006.01)
*H02M 7/42* (2006.01)

(52) U.S. Cl.
CPC ............... *H02J 3/383* (2013.01); *H02J 3/38* (2013.01); *H02J 7/35* (2013.01); *H02M 7/42* (2013.01); *H02J 2003/388* (2013.01)

(58) Field of Classification Search
None
See application file for complete search history.

(56) References Cited

U.S. PATENT DOCUMENTS 8,279,642 B2 * 10/2012 Chapman .................. H02J 3/38
363/39
10,074,989 B2 * 9/2018 Baba ......................... G05F 1/67
(Continued)

FOREIGN PATENT DOCUMENTS

JP 2000-116010 A 4/2000
JP 2003-319561 A 11/2003
(Continued)

OTHER PUBLICATIONS

International Search Report dated Apr. 19, 2016, issued by Japan Patent Office for International Application No. PCT/JP2016/055702.

*Primary Examiner* — Cassandra F Cox
(74) *Attorney, Agent, or Firm* — Procopio Cory Hargreaves and Savitch LLP

(57) ABSTRACT

A PCS comprises a DC/DC convertor that converts a voltage of a DC power input from a solar cell; an inverter that converts the DC power to an AC power; and a controller 134 that stops an operation of the DC/AC convertor without stopping the inverter when a condition that stops an output of the solar cell is satisfied.

15 Claims, 13 Drawing Sheets

(56) References Cited

U.S. PATENT DOCUMENTS

2010/0288327 A1    11/2010   Lisi et al.
2013/0169064 A1    7/2013   Park et al.
2014/0252862 A1    9/2014   Cheng et al.

FOREIGN PATENT DOCUMENTS

JP    2014-171359 A    9/2014
WO    2013/118266 A1    8/2013
WO    2014/103351 A1    7/2014

\* cited by examiner

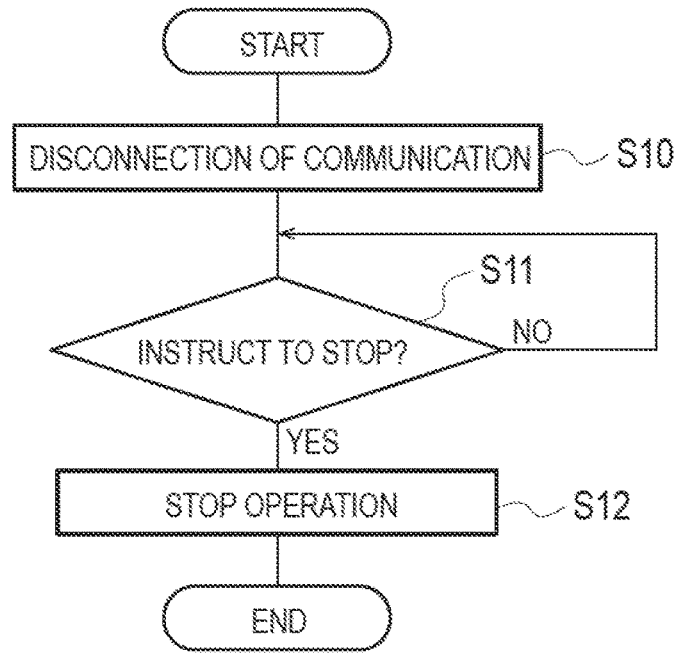
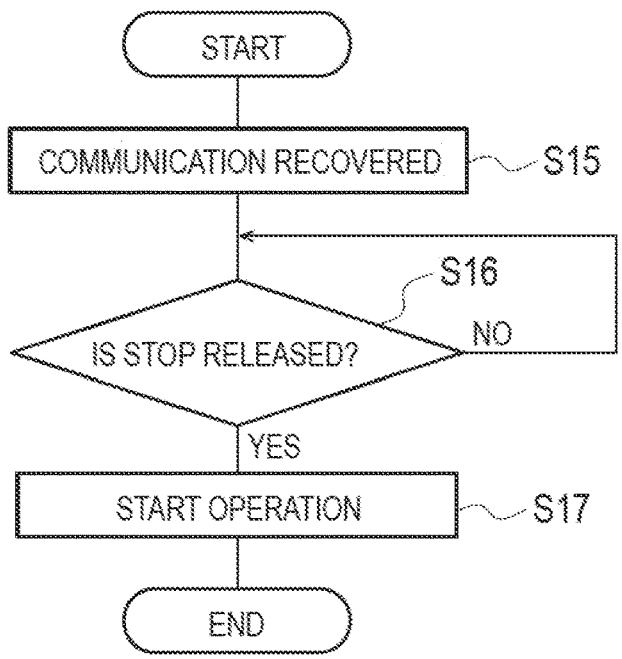

FIG. 12

| STATE | PV(kW) | STORAGE BATTERY (kW) | RECORDED VALUE (kW) |
|---|---|---|---|
| BATTERY STOPPED | 2.0kW | 0kW | 2.0kW |
| BATTERY DISCHARGED | 2.0kW | 1.0kW | 2.0kW |
| BATTERY CHARGED | 2.0kW | -1.0kW | 1.0kW |
| SELF-SUSTAINED | 2.0kW | 1.0kW | 0.0kW |

POWER CONVERTING APPARATUS AND POWER CONVERTING METHOD

TECHNICAL FIELD

The present invention relates to a power converting apparatus and a power converting method by which a DC power is converted to an AC power.

BACKGROUND ART

A power converting apparatus (power conditioner) connected to a distributed power source that outputs a DC (Direct Current) power is known. The power converting apparatus includes a direct current convertor (DC/DC convertor) that converts a voltage of a DC power input from the distributed power source; and an inverter that converts the DC power input from the direct current convertor to an AC (Alternating Current) power (for example, Patent Document 1).

PRIOR ART DOCUMENT

Patent Document

Patent Document 1: Japanese Application Publication No. 2014-171359

SUMMARY OF THE INVENTION

A aspect is abstracted as a power converting apparatus comprising a first direct current convertor that converts a voltage of a DC (Direct Current) power input from a first distributed power source; an inverter that converts the DC power input from the first direct current convertor to an AC (Alternating Current) power; and a controller that stops an operation of the first direct current convertor without stopping the inverter when a condition that stops an output of the first distributed power source is satisfied.

A aspect is abstracted as a power converting method comprising the steps of: (A) converting a voltage of a DC power input from a first distributed power source by a first direct current convertor; (B) converting the DC power converted in the (A) to an AC power by an inverter; and (C) stopping an operation of the first direct current convertor when a condition that stops an output of the distributed power source is satisfied.

BRIEF DESCRIPTION OF THE DRAWINGS

FIG. 3 is a flowchart illustrating a control method according to the embodiment.

FIG. 4 is a flowchart illustrating a control method according to the embodiment.

FIG. 12 is a diagram for describing a verification record according to another embodiment.

DESCRIPTION OF THE EMBODIMENT

Figure 1:
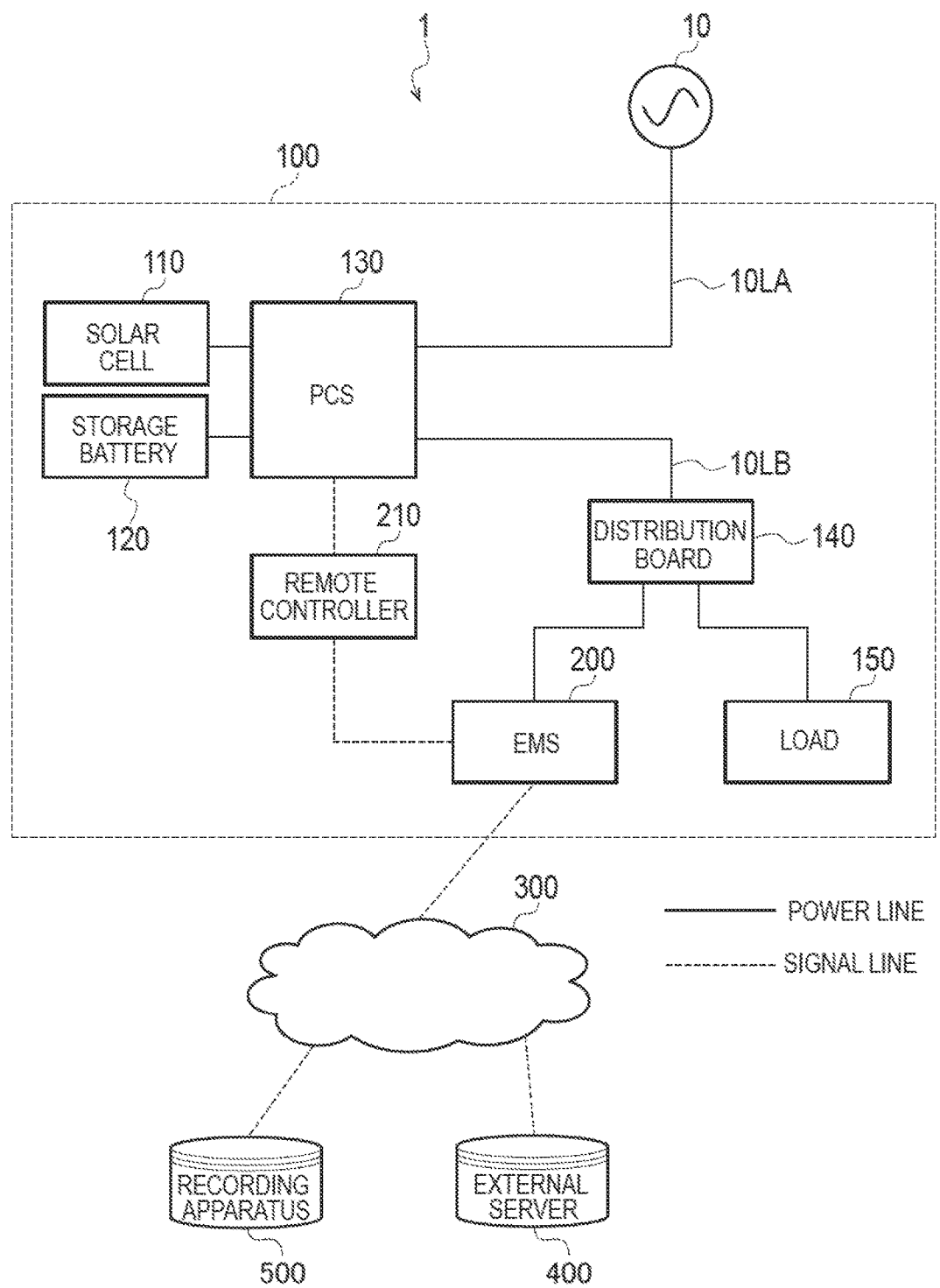
FIG. 1 is a diagram illustrating a power management system 1 according to an embodiment.

An embodiment is described below by referring to the drawings. In the following description of the drawings, same or similar reference numerals are given to denote same or similar portions.

Note that the drawings are merely schematically shown and proportions of sizes and the like are different from actual ones. Thus, specific sizes and the like should be judged by referring to the description below. In addition, there are of course included portions where relationships or ratios of sizes of the drawings are different with respect to one another.

Overview of Embodiment

A power converting apparatus, which sometimes receives from an external server a message instructing a suppression of an output of a distributed power source (hereinafter, output suppression message), is desired to stop the output of the distributed power source when communication between the external server and the power converting apparatus is disconnected. Alternatively, the power converting apparatus is desired to stop the output of the distributed power source also when the output suppression message is a message instructing a stop of the output. In the description that follows, a case where the output of the distributed power source is desirably stopped is assumed to be a case where the output of the distributed power source must be stopped, as a system, in a consumer's facility having a distributed power source.

In the above-described conventional technology, it is assumed that when the power is not output from the distributed power source (fuel cell, for example) (at a timing at which the distributed power source is newly connected to the power converting apparatus, for example), if an operation of an inverter is stopped, then the power may not be supplied via the inverter from a power grid to the distributed power source, so that it is not possible to activate the distributed power source.

Further, in the above-described conventional technology, also known is a power converting apparatus that converts not only the DC power input from the above-described distributed power source but also a DC power input from a storage battery to an AC power. However, it may be assumed that in this type of power converting apparatus, when the operation of the inverter is stopped when the output of the distributed power source is suppressed, the storage battery cannot be charged nor discharged.

A power converting apparatus according to the embodiment comprises: a first direct current convertor that converts a voltage of a DC (Direct Current) power input from a first distributed power source; an inverter that converts the DC power input from the first direct current convertor to an AC (Alternating Current) power; and a controller that stops an operation of the first direct current convertor without stopping the inverter when a condition that stops an output of the first distributed power source is satisfied.

In the embodiment, the controller stops the operation of the first direct current convertor when a condition that stops the output of the first distributed power source is satisfied. Therefore, also in a case for stopping the output of the distributed power source, it is possible to continue to charge and discharge the storage battery.

The power converting apparatus according to the embodiment includes a second direct current convertor that converts a voltage of a DC power input from a second distributed power source, in which the inverter may convert the DC power input from the first direct current convertor to an AC power.

The first distributed power source may be capable of passing the power output from the first distributed power source to a power grid from a consumer's facility where the first distributed power source is provided. The second distributed power source may be capable of passing the power output from the second distributed power source to a power grid from a consumer's facility where the second distributed power source is provided. At least one of the first distributed power source and the second distributed power source may be a solar cell, a fuel cell, a storage battery, a wind power generator or the like.

Embodiment

A power management system according to an embodiment will be described, below. FIG. 1 is a diagram illustrating the power management system 1 according to the embodiment.

As illustrated in FIG. 1, the power management system 1 includes a consumer's facility 100, an external server 400, and a recording apparatus 500. The consumer's facility 100 has an EMS 200, and the EMS 200 communicates with the external server 400 and the recording apparatus 500 via a network 300.

The consumer's facility 100 includes a solar cell 110, a storage battery 120, a PCS 130, a distribution board 140, and a load 150. Furthermore, the consumer's facility 100 includes the EMS 200 and a remote controller 210.

The solar cell 110 is an equipment that generates power in response to reception of solar light. The solar cell 110 outputs the generated DC power. An amount of power to be generated by the solar cell 110 varies depending on an amount of the solar radiation entering the solar cell 110. The solar cell 110 is an example of a distributed power source to operate in accordance with an output suppression message described later.

The storage battery 120 is an equipment in which power is accumulated. The storage battery 120 outputs the accumulated DC power. In the embodiment, the storage battery 120 may need not to operate in accordance with the output suppression message described later.

The PCS 130 is an example of a power converting apparatus (PCS: Power Conditioning System) that converts a DC power to an AC power. In the embodiment, the PCS 130 is connected to a main power line 10L (herein, a main power line 10LA and a main power line 10LB) connected to a power grid 10, and connected to both the solar cell 110 and the storage battery 120. The main power line 10LA is a power line connecting the power grid 10 and the PCS 130, and the main power line 10LB is a power line connecting the PCS 130 and the distribution board 140.

Here, the PCS 130 converts the DC power input from the solar cell 110 to an AC power, and converts the DC power input from the storage battery 120 to an AC power. Furthermore, the PCS 130 converts an AC power supplied from the power grid 10 to a DC power.

The distribution board 140 is connected to the main power line 10L (herein, the main power line 10LB). The distribution board 140 divides the main power line 10LB into a plurality of power lines, and distributes the power to an equipment (herein, the load 150 and the EMS 200) connected to the plurality of power lines.

The load 150 is an equipment in which the power supplied via the power line is consumed. Examples of the load 150 include an equipment such as a refrigerator, a lighting, an air conditioner, and a TV. The load 150 may be a single equipment, and may include a plurality of equipments.

The EMS 200 is an equipment (EMS: Energy Management System) that manages power information indicating the power supplied to the consumer's facility 100 from the power grid 10. The EMS 200 may manage an amount of power to be generated by the solar cell 110, an amount of power to be stored in the storage battery 120, and an amount of power to be discharged from the storage battery 120.

In the embodiment, the EMS 200 is connected to the remote controller 210 and the network 300. For example, the EMS 200 receives the output suppression message described later from the external server 400, and notifies the remote controller 210 of the output suppression message. Alternatively, the EMS 200 receives a schedule (calendar) described later from the external server 400, and based on the schedule (calendar), notifies the remote controller 210 of the output suppression message.

The PCS 130 has the remote controller 210 provided in connection with the PCS 130, and the remote controller 210 notifies the PCS 130 of various types of messages to operate the PCS 130. For example, the remote controller 210 notifies the PCS 130 of the output suppression message received from the EMS 200. It should be noted that the remote controller 210 may be provided in conjunction with the EMS 200, or may be provided separately from the EMS 200 and the PCS 130.

The network 300 is a communication network by which the EMS 200, the external server 400, and the recording apparatus 500 are connected. The network 300 may be the Internet. The network 300 may include a mobile communication network.

The external server 400 notifies the output suppression message that is a message to instruct suppression of the output of the distributed power source (herein, the solar cell 110). Here, the external server 400 may manage a schedule (calendar), as a whole of the power grid 10, including a date and time for suppressing the output of the distributed power source. The external server 400 notifies the output suppression message, based on such a schedule (calendar). Alternatively, the external server 400 may notify the EMS 200 of such a schedule (calendar). That is, the external server 400 is a server instructing the output suppression of the distributed power supply.

Here, the output suppression message and the schedule (calendar) include information indicating a suppression degree (an output suppression power threshold, for example) for the output of the distributed power source (herein, the solar cell 110). The suppression degree may be represented by an absolute value (xx kW, for example) of the output of the distributed power source (herein, the solar cell 110). Alternatively, the suppression degree may be represented by a relative value (decrease by xx kW, for example) of the output of the distributed power source (herein, the solar cell 110). Alternatively, the suppression degree may be represented by a suppression rate (xx %, for example) of the output of the distributed power source (herein, the solar cell 110). The suppression rate may be a rate of the distributed power source relative to the output certified, as an output capability of the PCS that controls the distributed power source (hereinafter, facility certified output), when the distributed power source is installed in the consumer's facility 100. If the output capability of the distributed power source and that of the PCS differ, either one of a smaller output capability is selected, as the facility certified output. When a plurality of PCSs are installed, the facility certified output is a sum of the output capabilities of the plurality of PCSs.

The recording apparatus 500 is an apparatus that records various types of information. Specifically, the recording apparatus 500 records a verification record including whether or not the suppression of the output of the distributed power source is correctly executed according to the output suppression message. The verification record is an amount of power output from the distributed power source after reception of the output suppression message. The amount of power output from the distributed power source may be accumulated in an accumulation period (30 minutes, for example). In such a case, in the verification record accumulated for each accumulation period, the suppression of the output of the distributed power source may be correctly executed.

(Power Converting Apparatus)

Figure 2:
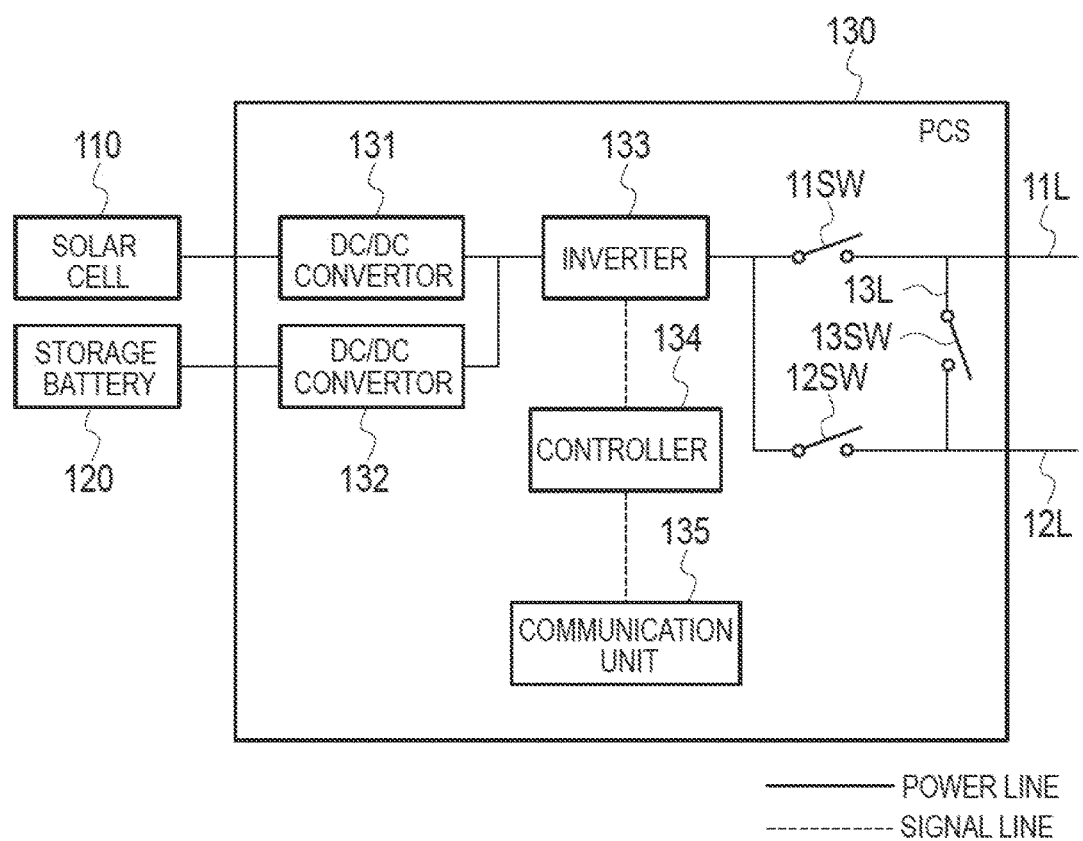
FIG. 2 is a diagram illustrating a PCS 130 according to the embodiment.

The power converting apparatus according to the embodiment will be described below. FIG. 2 is a diagram illustrating the PCS 130 according to the embodiment.

As illustrated in FIG. 2, the PCS 130 is connected to a power line 11L connected to the main power line 10LA, and a power line 12L connected to the main power line 10LB. Furthermore, a power line 13L connecting the power line 11L and the power line 12L is provided. The power line 13L is connected closer to the power line 11L at the main power line 10LA side than a switch 11SW, and connected closer to the power line 12L at the main power line 10LB than a switch 12SW.

The power line 11L is a power line connecting the power grid 10 and an inverter 133. The power line 11L may be a power line configuring a part of the main power line 10LA, and may be a power line divided from the main power line 10LA. The power line 12L is a power line connecting the inverter 133 and the distribution board 140 (load 150). The power line 12L may be a power line configuring a part of the main power line 10LB, and may be a power line divided from the main power line 10LB.

The PCS 130 includes the switch 11SW provided on the power line 11L, the switch 12SW provided on the power line 12L, and a switch 13SW provided on the power line 13L.

The switch 11SW is controlled to be in a closed state in a grid connected state in which the PCS 130 is connected to the power grid 10. On the other hand, the switch 11SW is controlled to be in an opened state in a self-sustained state in which the PCS 130 parallels off the power grid 10.

The switch 12SW is controlled to be in an opened state in a grid connected state in which the PCS 130 is connected to the power grid 10. On the other hand, the switch 11SW is controlled to be in a closed state in a self-sustained state in which the PCS 130 is disconnected from the power grid 10.

The switch 13SW is controlled to be in a closed state in a grid connected state in which the distribution board 140 (load 150) is connected to the power grid 10. Likewise, the switch 13SW is controlled to be in a closed state in a grid connected state in which the PCS 130 is connected to the power grid 10. On the other hand, the switch 13SW is controlled to be in an opened state in a self-sustained state in which the distribution board 140 (load 150) is disconnected from the power grid 10. Likewise, the switch 13SW is controlled to be in an opened state in a self-sustained state in which the PCS 130 is disconnected from the power grid 10.

Generally, in the grid connected state in which the consumer's facility 100 is connected to the power grid 10, both the PCS 130 and the distribution board 140 (load 150) are connected to the power grid 10. Therefore, in such a grid connected state, the switch 11SW and the switch 13SW are controlled to be in a closed state, and the switch 12SW is controlled to be in an opened state. On the other hand, generally, in the self-sustained state in which the consumer's facility 100 is disconnected from the power grid 10, both the PCS 130 and the distribution board 140 (load 150) are not connected to the power grid 10. Therefore, in such a self-sustained state, the switch 11SW and the switch 13SW are controlled to be in an opened state, and the switch 12SW is controlled to be in a closed state.

As illustrated in FIG. 2, the PCS 130 includes a DC/DC convertor 131, a DC/DC convertor 132, the inverter 133, a controller 134, and a communication unit 135.

The DC/DC convertor 131 is a first direct current convertor that converts a voltage of a DC power input from the solar cell 110. The DC/DC convertor 131 may upconvert the voltage of the DC power and downconvert the voltage of the DC power.

The DC/DC convertor 132 is a second direct current convertor that converts a voltage of a DC power input from the storage battery 120. Furthermore, the DC/DC convertor 132 converts a voltage of the DC power input from the inverter 133. The DC/DC convertor 132 may upconvert the voltage of the DC power and may downconvert the voltage of the DC power.

An operation of outputting the DC power from the storage battery 120 to the DC/DC convertor 132 may be discharge from the storage battery 120. The operation of outputting the DC power from the DC/DC convertor 132 to the storage battery 120 may be charge into the storage battery 120.

The inverter 133 converts the DC power input from the DC/DC convertor 131 and the DC power input from the DC/DC convertor 132, to an AC power. Furthermore, the inverter 133 converts the AC power supplied from the power grid 10 to a DC power.

The controller 134 controls the PCS 130. Firstly, the controller 134 controls an amount of power generated by the solar cell 110. In particular, the controller 134 controls the amount of power generated by the solar cell 110 by MPPT Maximum Power Point Tracking) method. As a result, an operation point (point determined by an operation-point voltage value and power value, or a point determined by an operation-point voltage value and electric current value) of the solar cell 110 is optimized. Secondly, the controller 134 controls the charge amount and the discharge amount in the storage battery 120.

Here, the controller 134 suppresses the output of the solar cell 110 according to the output suppression message or the schedule (calendar). As described above, the suppression degree may be represented by an absolute value (xx kW, for example) of the output of the solar cell 110. Alternatively, the suppression degree may be represented by a relative value (decrease by xx kW, for example) of the output of the solar cell 110. Alternatively, the suppression degree may be represented with a suppression rate (xx %, for example) of the output of the solar cell 110.

In the embodiment, the controller 134 stops the operation of the DC/DC convertor 31 when a condition for stopping the output of the solar cell 110 is satisfied. In such a case, the controller 134 stops the operation of the DC/DC convertor 131 without stopping the operation of the inverter 133. Here "without stopping the operation of the inverter 133" may be a state where the controller 134 does out output a stop signal to the inverter 133 or a state where the operation of the inverter 133 is not stopped. Furthermore, the controller 134 stops, when stopping the operation of the DC/DC convertor 131, the operation of the DC/DC convertor 131 without stopping the operation of the DC/DC convertor 132.

In the embodiment, the condition for stopping the output of the solar cell 110 is a condition that the communication between the external server 400 and the PCS 130 is disconnected. A factor of disconnecting the communication between the external server 400 and the PCS 130 may be disconnection of the communication between the external server 400 and the EMS 200 and disconnection of the communication between the EMS 200 and the remote controller 210. Alternatively, a factor of disconnecting the communication between the external server 400 and the PCS 130 may be disconnection of the communication between the remote controller 210 and the communication unit 135.

For example, when an instance to determine that the communication is disconnected occurs, such as not receiving by the external server 400 a response to a signal transmitted to the external server 400 from the EMS 200 in the communication between the external server 400 and the EMS 200, a message indicating the disconnection of the communication is transmitted to the controller 134 from the EMS 200.

The controller 134 detects the disconnection of the communication upon receipt of the message indicating the disconnection of the communication from the EMS 200. Alternatively, when an instance to determine that the communication is disconnected occurs, such as not receiving by the EMS 200 a response to a signal transmitted to the EMS 200 from the remote controller 210 in the communication between the EMS 200 and the remote controller 210, a message indicating the disconnection of the communication is transmitted to the controller 134 from the remote controller 210.

The controller 134 may detect the disconnection of the communication by receiving the message indicating the disconnection of the communication from the remote controller 210. In such a case, the message indicating the disconnection of the communication may be replaced by a message instructing an operation stop of the solar cell 110 (hereinafter, operation stop instruction).

The disconnection of the communication may not include an instantaneous communication disconnection. Specifically, the controller 134 may detect the disconnection of the communication when a state where the communication is disconnected continues over a constant period (five minutes, for example). It is noted that the disconnection of the communication is an aspect where the communication state between the external server 400 and the PCS 130 is equal to or less than a predetermined threshold. The communication state is determined by a magnitude of a predetermined threshold such as RSSI (Received Signal Strength Indication), SNR (Signal to Noise Ratio), or SIR (Signal to Interference Ratio), for example. More specifically, in the communication between the external server 400 and the EMS 200, for example, when a value of the RSSI of the communication is equal to or less than a predetermined threshold, "determination of the communication state being equal to or less than a predetermined threshold" is made.

The controller 134 outputs a verification record including whether or not the suppression of the output of the solar cell 110 is correctly executed according to the output suppression message or a schedule (calendar). As described above, the verification record is an amount of power output from the solar cell 110 after the output suppression message is received. The controller 134 outputs zero as the verification record when the operation of the DC/DC convertor 131 is stopped.

The communication unit 135 communicates with the remote controller 210. For example, the communication unit 135 receives the output suppression message notified from the external server 400. The communication unit 135 transmits to the recording apparatus 500 the verification record output from the controller 134.

Furthermore, the communication unit 135 receives, when it is detected by the EMS 200 or the remote controller 210 that the communication is disconnected, a message indicating the disconnection of communication from the EMS 200 or the remote controller 210. In such a case, the message indicating the disconnection of the communication may be replaced by a message instructing an operation stop of the solar cell 110 (operation stop instruction). In the embodiment, the communication unit 135 receives an operation stop instruction from the EMS 200 or the remote controller 210.

(Control Method)

A control method according to the embodiment will be described below. FIG. 3 and FIG. 4 are flowcharts showing the control method according to the embodiment.

Firstly, a case of stopping the output of the solar cell 110 will be explained with reference to FIG. 3.

As illustrated in FIG. 3, in step S10, the communication between the external server 400 and the PCS 130 is disconnected. Here, the disconnection of the communication between the external server 400 and the PCS 130 is disconnection of the communication between the external server 400 and the EMS 200 and disconnection of the communication between the EMS 200 and the remote controller 210.

In step S11, the PCS 130 determines whether or not a message instructing the stop of the operation of the solar cell 110 (operation stop instruction) has been received from the remote controller 210. If a determination result is YES, the PCS 130 moves to a process of step S12. If the determination result is NO, the PCS 130 holds steady.

In step S12, the PCS 130 stops the operation of the DC/DC convertor 131 connected to the solar cell 110 to stop the operation of the solar cell 110.

Secondly, a case of resuming the output of the solar cell 110 will be explained with reference to FIG. 4.

As illustrated in FIG. 4, in step S15, the communication between the external server 400 and the PCS 130 is recovered.

In step S16, the PCS 130 determines whether or not a message instructing a release of the operation stop of the solar cell 110 (operation stop release instruction) has been received from the remote controller 210. When a determination result is YES, a condition for stopping the output of the distributed power source is not satisfied, and thus, the PCS 130 moves to a process of step S16. If the determination result is NO, the PCS 130 holds steady.

In step S17, the PCS 130 may automatically start the operation of the DC/DC convertor 131 connected to the solar cell 110 to start the operation of the solar cell 110. On the other hand, when the condition for stopping the output of the distributed power source is not satisfied any more, the controller 134 need not to automatically start the operation of the DC/DC convertor 131. That is, the controller 134 is in a state of stopping the operation of the DC/DC convertor 131 when the condition for stopping the output of the distributed power source is not satisfied any more. In this case, in order to start the operation of the DC/DC convertor 131, a user applies a manual operation. When the condition for stopping the output of the distributed power source is not satisfied any more, the user may previously set whether the operation of the DC/DC convertor 131 is automatically started or not automatically started.

(Operation and Effect)

In the embodiment, when the condition for stopping the output of the distributed power source is satisfied, the inverter 133 is not stopped but the DC/DC convertor 131 is stopped, and thus, as compared to a case where the operations of both the DC/DC convertor 131 and the inverter 133 are stopped, it is possible to expect that a time period for restarting can be shortened.

Further, in the embodiment, in the PCS 130 that converts the DC power input both from the solar cell 110 and the storage battery 120 to the AC power, the PCS 130 stops the operation of the DC/DC convertor 131 when receiving the message (operation stop instruction) instructing the operation stop of the solar cell 110. Therefore, also in a case for stopping the output of the solar cell 110, it is possible to continue charging and discharging of the storage battery 120.

Another Embodiment

Another embodiment will be described, below. A difference from the above-described embodiment will be described, below.

Figure 5:
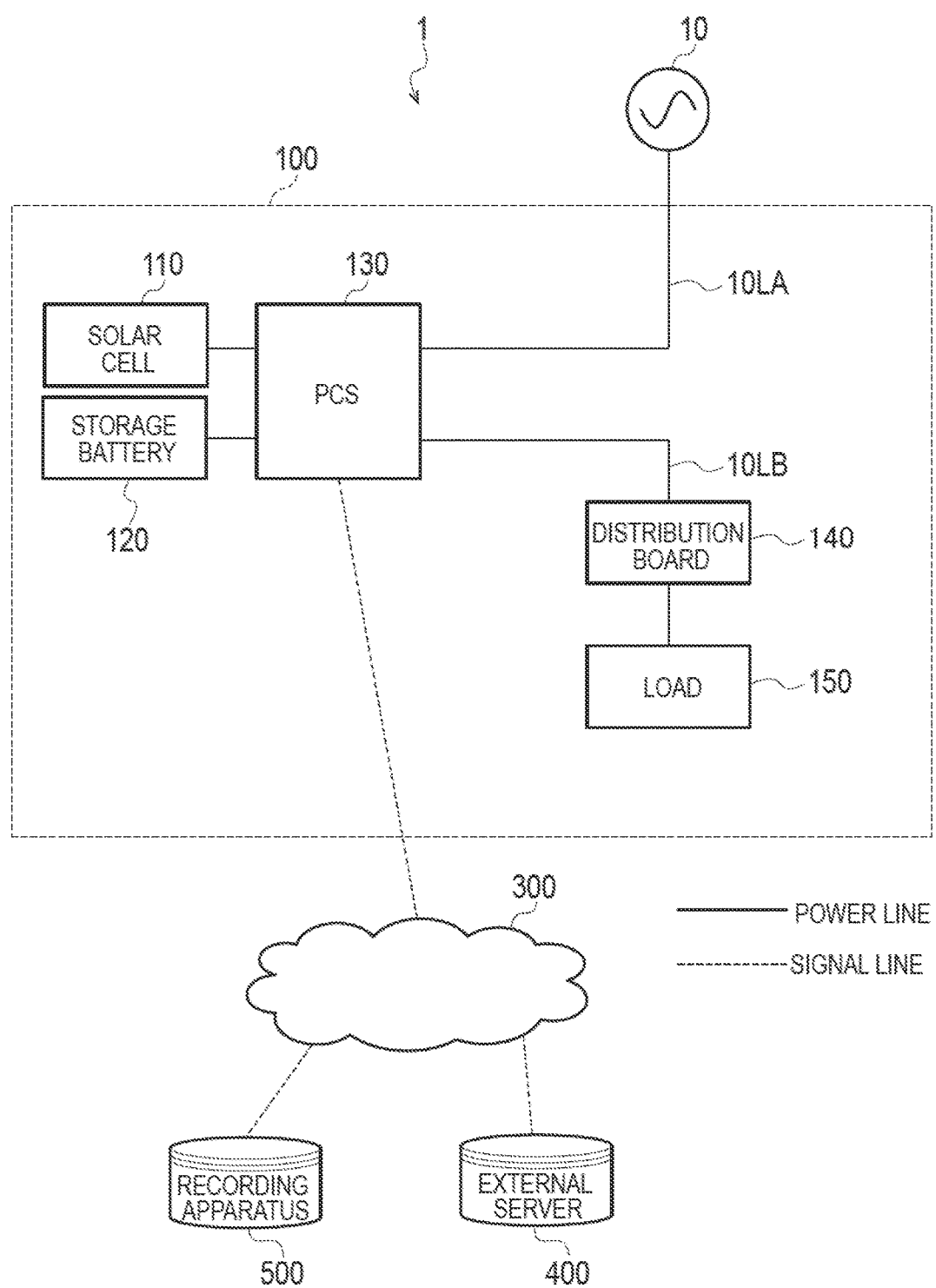
FIG. 5 is a diagram illustrating the power management system 1 according to another embodiment.

In the other embodiment, the consumer's facility 100 does not have the EMS 200 and the remote controller 210, as illustrated in FIG. 5. The PCS 130 (communication unit 135) is directly connected to the network 300, and communicates with the external server 400 and the recording apparatus 500.

Therefore, the PCS 130 (controller 134) detects the disconnection of the communication between the external server 400 and the communication unit 135. For example, the PCS 130 (controller 134) may detect the disconnection of the communication depending upon whether or not a beacon signal cyclically transmitted from the external server 400 is successfully received. Alternatively, the PCS 130 (controller 134) may detect the disconnection of the communication by monitoring the network 300.

(Control Method)

Figure 6:
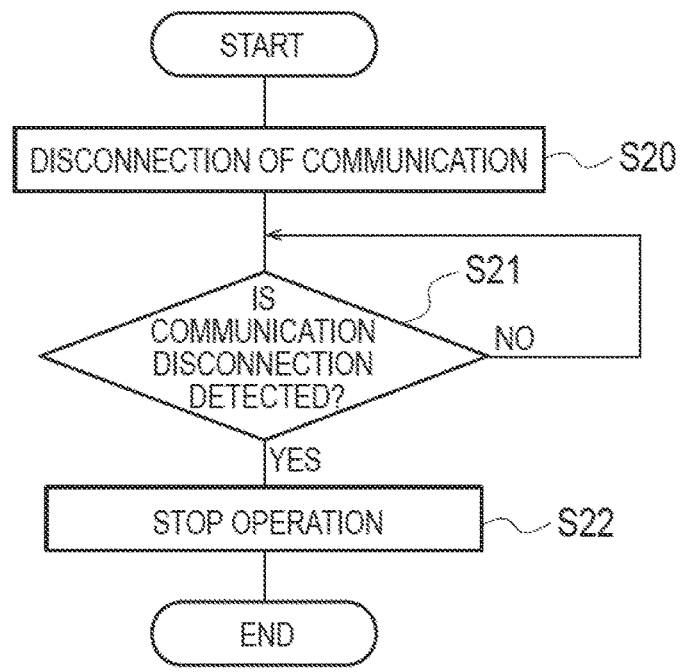
FIG. 6 is a flowchart illustrating a control method according to another embodiment.
Figure 7:
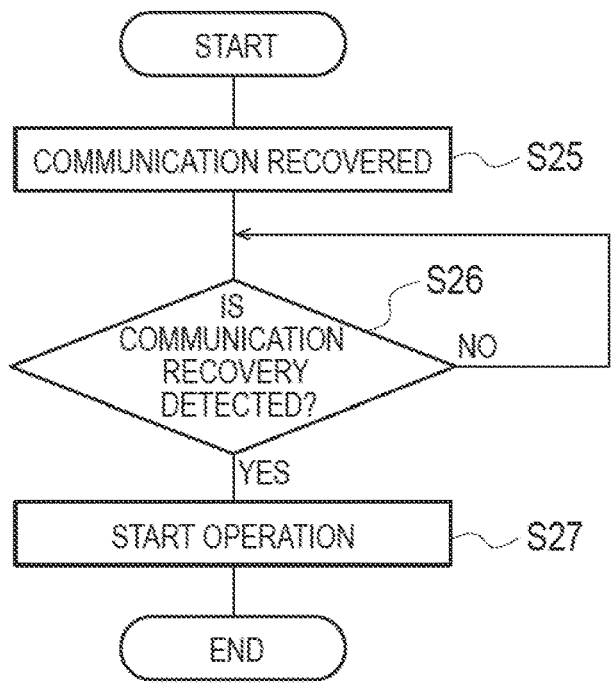
FIG. 7 is a flowchart illustrating a control method according to another embodiment.

A control method according to another embodiment will be described below. FIG. 6 and FIG. 7 are flowcharts showing the control method according to the other embodiment.

Firstly, a case of stopping the output of the solar cell 110 will be explained with reference to FIG. 6.

As illustrated in FIG. 6, in step S20, the communication between the external server 400 and the PCS 130 is disconnected.

In step S21, the PCS 130 determines whether or not the communication disconnection has been detected. If a determination result is YES, the PCS 130 moves to a process of step S22. If the determination result is NO, the PCS 130 holds steady.

In step S22, the PCS 130 stops the operation of the DC/DC convertor 131 connected to the solar cell 110 to stop the operation of the solar cell 110.

Secondly, a case of resuming the output of the solar cell 110 will be explained with reference to FIG. 7.

As illustrated in FIG. 7, in step S25, the communication between the external server 400 and the PCS 130 is recovered.

In step S26, the PCS 130 determines whether or not the communication recovery has been detected. If a determination result is YES, the PCS 130 moves to a process of step S27. If the determination result is NO, the PCS 130 holds steady.

In step S27, the PCS 130 starts the operation of the DC/DC convertor 131 connected to the solar cell 110 to start the operation of the solar cell 110.

(Operation and Effect)

In the other embodiment, in the PCS 130 that converts the DC power input both from the solar cell 110 and the storage battery 120 to the AC power, the PCS 130 stops the operation of the DC/DC convertor 131 when detecting the disconnection of the communication between the external server 400 and the PCS 130. Therefore, also in a case for stopping the output of the solar cell 110, it is possible to continue charging and discharging of the storage battery 120.

Another Embodiment

Another embodiment will be described, below. A difference from the above-described embodiment will be described, below.

In the other embodiment, the condition for stopping the output of the solar cell 110 is not a condition that the communication between the external server 400 and the PCS 130 is disconnected, but a condition that the output suppression message instructing a stop of the output of the solar cell 110 is received. For example, the output suppression message instructing the stop of the output of the solar cell 110 may be a message indicating 0 kW as an absolute value of the output of the solar cell 110 and may be a message indicating 0% as a suppression rate of the output of the solar cell 110.

In the other embodiment, as illustrated in FIG. 1, the EMS 200 and the remote controller 210 may be provided, and as illustrated in FIG. 5, the EMS 200 and the remote controller 210 may not be provided.

(Control Method)

Figure 8:
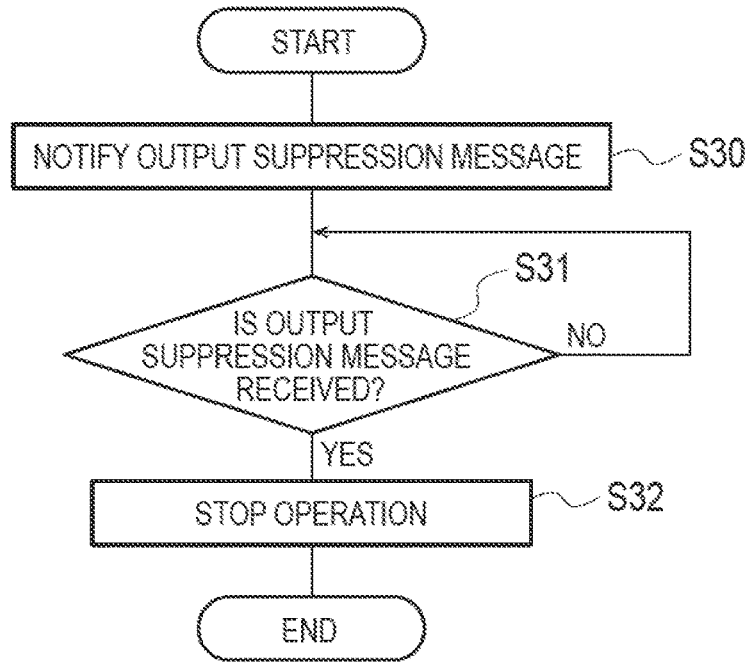
FIG. 8 is a flowchart illustrating a control method according to another embodiment.
Figure 9:
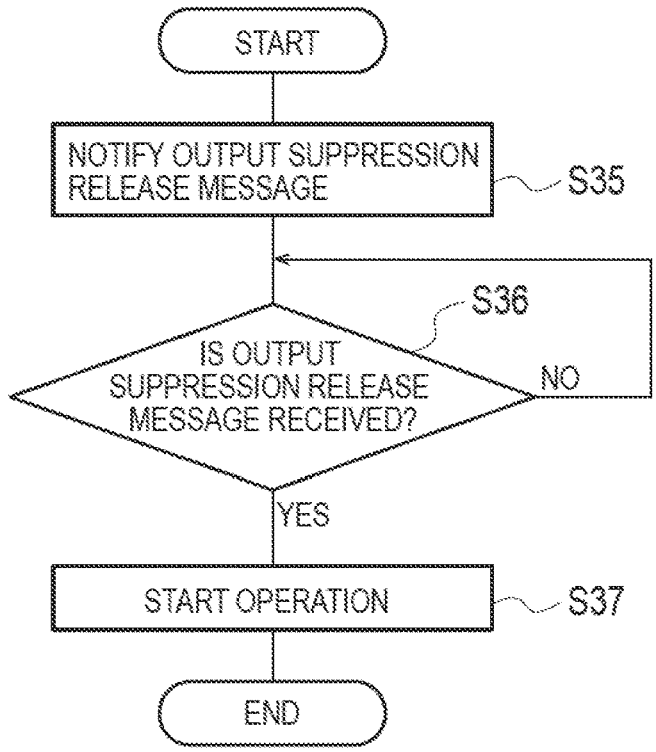
FIG. 9 is a flowchart illustrating a control method according to another embodiment.

A control method according to another embodiment will be described below. FIG. 8 and FIG. 9 are flowcharts illustrating the control method according to the other embodiment.

Firstly, a case of stopping the output of the solar cell 110 will be explained with reference to FIG. 8.

As illustrated in FIG. 8, in step S30, the external server 400 notifies the output suppression message instructing the stop of the output of the solar cell 110.

In step S31, the PCS 130 determines whether or not the output suppression message instructing the stop of the output of the solar cell 110 has been received. If a determination result is YES, the PCS 130 moves to a process of step S32. If the determination result is NO, the PCS 130 holds steady.

In step S32, the PCS 130 stops the operation of the DC/DC convertor 131 connected to the solar cell 110 to stop the operation of the solar cell 110.

Secondly, a case of resuming the output of the solar cell 110 will be explained with reference to FIG. 9.

As illustrated in FIG. 9, in step S35, the external server 400 notifies the output suppression release message instructing the release of the stop of the output of the solar cell 110.

In step S36, the PCS 130 determines whether or not the output suppression release message is received. If a determination result is YES, the PCS 130 moves to a process of step S37. If the determination result is NO, the PCS 130 holds steady.

In step S37, the PCS 130 starts the operation of the DC/DC convertor 131 connected to the solar cell 110 to start the operation of the solar cell 110.

(Operation and Effect)

In the other embodiment, in the PCS 130 that converts the DC power input both from the solar cell 110 and the storage battery 120 to the AC power, the PCS 130 stops the operation of the DC/DC convertor 131 when receiving the output suppression message instructing the stop of the output of the solar cell 110. Therefore, also in a case for stopping the output of the solar cell 110, it is possible to continue charging and discharging of the storage battery 120.

Another Embodiment

Another embodiment will be described, below. A difference from the above-described embodiment will be described, below.

Figure 10:
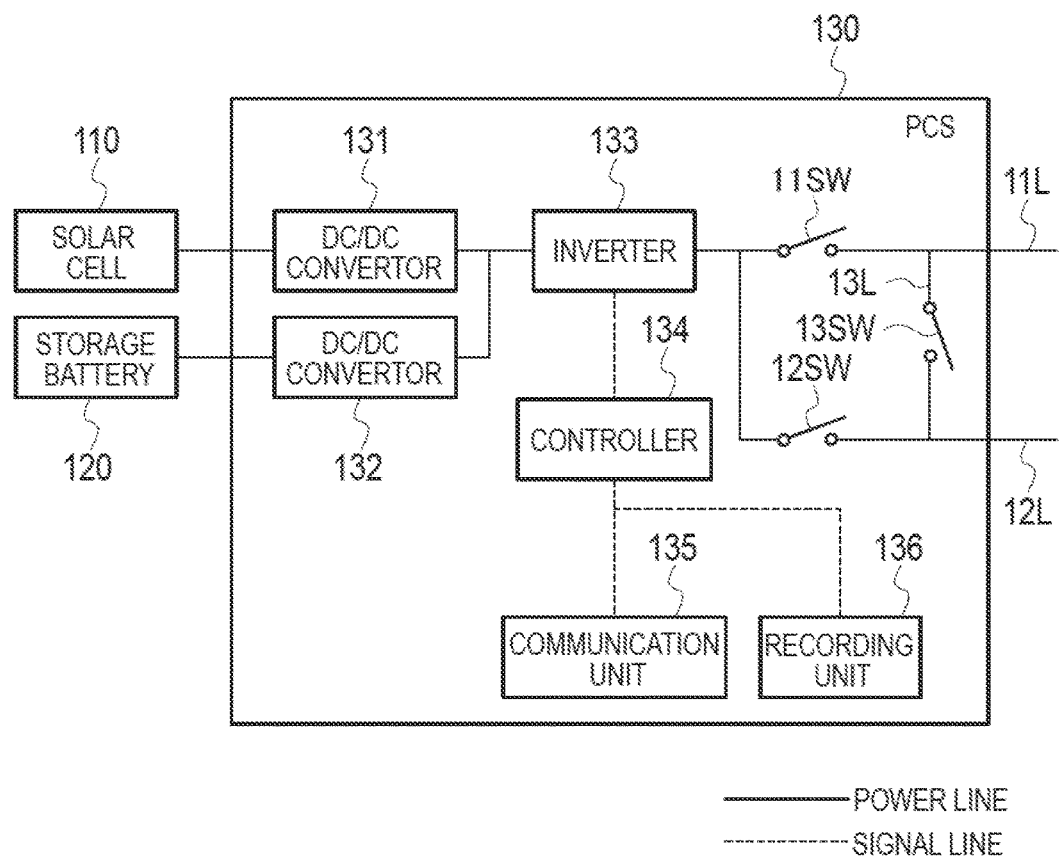
FIG. 10 is a diagram illustrating a PCS 130 according to another embodiment.

In the other embodiment, the PCS 130 includes a recording unit 136, as illustrated in FIG. 10. The recording unit 136 records, in much the same way as the recording apparatus 500, a verification record including whether or not the suppression of the output of the distributed power source is correctly executed according to the output suppression message. In such a case, the recording unit 136 may record the verification record output from the controller 134.

In the other embodiment, the recording unit 136 that records the verification record is provided in the PCS 130, and thus, the power management system 1 need not to include the recording apparatus 500.

Another Embodiment

Another embodiment will be described, below. A difference from the above-described embodiment will be described, below.

Overview of the Other Embodiment

In the above-described conventional technology, the output suppression message is a message for suppressing the reverse power flow to the power grid side, and thus, it may suffice that the reverse power flow to the power grid side is suppressed according to the output suppression message. Further, also known is a power converting apparatus that converts not only the DC power input from the above-described distributed power source but also a DC power input from a storage battery to an AC power.

However, in such a power converting apparatus, when the output power of the distributed power source is recorded as the verification record, the output of the distributed power source is excessively suppressed in spite of the reverse power flow to the power grid side being suppressed according to the output suppression message, as a result of which the user may receive a disadvantage.

A power management system according to the other embodiment includes: a distributed power source; a storage battery; a power converting apparatus that converts a DC power input from the distributed power source to an AC power, converts a DC power input from the storage battery to an AC power, and converts an AC power input from a power grid to a DC power output to the storage battery; and a recording apparatus that records a verification record including whether or not a suppression of the output of the distributed power source is correctly executed. The recording apparatus records, as the verification record, a value obtained by subtracting a charge power of the storage battery from an output power of the inverter when the storage battery is charged.

In the other embodiment, in a case where the power converting apparatus that converts the DC power input both from the distributed power source and the storage battery to the AC power is used, the recording apparatus records, as the verification record, the value obtained by subtracting the charge power of the storage battery from the output power of the inverter when the storage battery is charged. Therefore, it is less likely that the output of the distributed power source is excessively suppressed in spite of the reverse power flow to the power grid side being suppressed due to the output suppression. As a result, while the reverse power flow to the power grid side is suppressed due to the output suppression, it is possible to resolve the disadvantage of a user.

Details of the Other Embodiment

Figure 11:
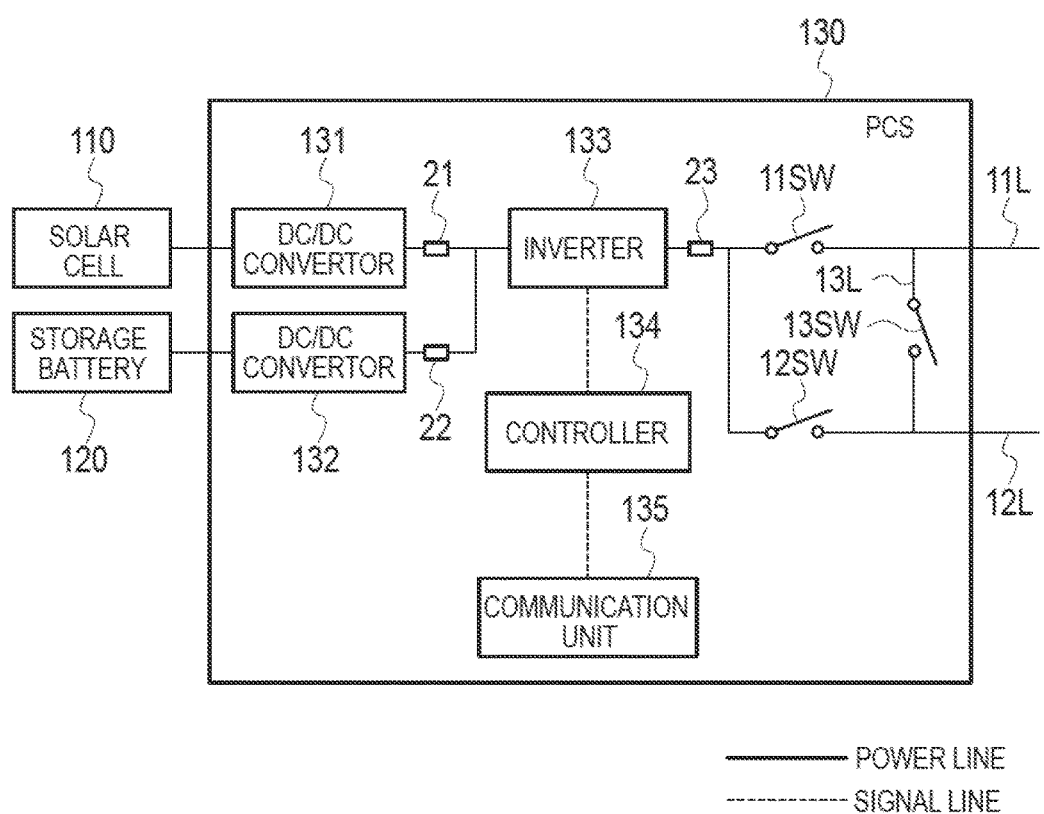
FIG. 11 is a diagram illustrating the PCS 130 according to another embodiment.

As illustrated in FIG. 11, the PCS 130 includes, in much the same way as in the embodiment, the switch 11SW (first relay switch) provided on the power line 11L, the switch 12SW (second relay switch) provided on the power line 12L, and the switch 13SW (third relay switch) provided on the power line 13L.

As illustrated in FIG. 11, the PCS 130 includes a CT 21 (first measuring instrument) that measures the DC power input from the solar cell 110 to the PCS 130, a CT 22 (second measuring instrument) that measures the DC power input from the storage battery 120 to the PCS 130 and the DC power input from the PCS 130 to the storage battery 120, and a CT 23 (third measuring instrument) that measures the output power of the PCS 130.

The CT 21 is provided at an output end of the DC/DC convertor 131, for example. The CT 21 may be provided at an input end of the DC/DC convertor 131. The CT 22 is provided at an output end of the DC/DC convertor 132, for example. The CT 22 may be provided at an input end of the DC/DC convertor 132. The CT 23 is provided at an output end of the inverter 133. It is noted that the CT 21 and the CT 22 may be provided at the both input end and output end, respectively.

In the other embodiment, the controller 134 outputs the verification record including whether or not the suppression of the output of the solar cell 110 is correctly executed according to the output suppression message or the schedule (calendar). Here, the verification record output from the controller 134 will be explained by dividing it into the following four cases with reference to FIG. 12. The four cases are (a) a state where the operation of the storage battery 120 is stopped (battery stopped), (b) a state where the storage battery 120 is discharged (battery discharged), (c) a state where the storage battery 120 is charged (battery charged), and (d) a state where the PCS 130 performs the self-sustained operation (self-sustained), as illustrated in FIG. 12.

In the (a) battery stopped, the controller 134 outputs, as the verification record, the output power of the solar cell 110. The output power of the solar cell 110 is the power measured by the CT 21. Alternatively, the controller 134 outputs, as the verification record, the output power of the inverter 133. The output power of the inverter 133 is the power measured by the CT 23.

In the (b) battery discharged, the controller 134 may output, as the verification record, the output power of the solar cell 110 rather than the output power of the inverter 133. The output power of the solar cell 110 is the power measured by the CT 21. That is, the verification record does not include the discharge power of the storage battery 120.

However, the controller 134 may output, as the verification record, the output power of the inverter 133. The output power of the inverter 133 is the power measured by the CT 23. That is, the verification record may be a total of the output power of the solar cell 110 and the discharge power of the storage battery 120.

In the (c) battery charged, the controller 134 outputs, as the verification record, a value obtained by subtracting the charge power of the storage battery 120 from the output power of the inverter 133. The charge power of the storage battery 120 is the power measured by the CT 22. The output power of the inverter 133 is the power measured by the CT 23.

In the (d) self-sustained, the controller 134 may output zero as the verification record. The above is performed in the self-sustained state to prevent the reverse power flow to the power grid 10. Here, the self-sustained state is an example of a case where the PCS 130 is not operating in a mode in which the reverse power flow to the power grid side is performed. The case where the PCS 130 is not operating in a mode in which the reverse power flow to the power grid side is performed may include not only the self-sustained state, for example, but also a consumer's facility consumed state where all the output power of the PCS 130 are consumed in the consumer's facility 100.

In the other embodiment, the controller 134 may correct the power measured by the CT 21 so that a total of the power measured by the CT 21 and the power measured by the CT 22 is power measured by the CT 23. Alternatively, the controller 134 may correct the power measured by the CT 21 and the CT 22 so that a total of the power measured by the CT 21 and the power measured by the CT 22 is power measured by the CT 23.

In the other embodiment, the controller 134 may output, while the output of the solar cell 110 is not suppressed, the output power of the solar cell 110 (power measured by the CT 21, for example), as a power generation history. The controller 134 may output, while the output of the solar cell 110 is not suppressed, charge/discharge power of the storage battery 120 (power measured by the CT 22, for example), as a charge/discharge history. The power generation history and the charge/discharge history are recorded in the recording apparatus 500, similarly to the verification record.

The communication unit 135 communicates with the remote controller 210. For example, the communication unit 135 receives the output suppression message notified from the external server 400. The communication unit 135 transmits the verification record output from the controller 134, by way of the remote controller 210 and the EMS 200, to the recording apparatus 500.

(Control Method)

Figure 13:
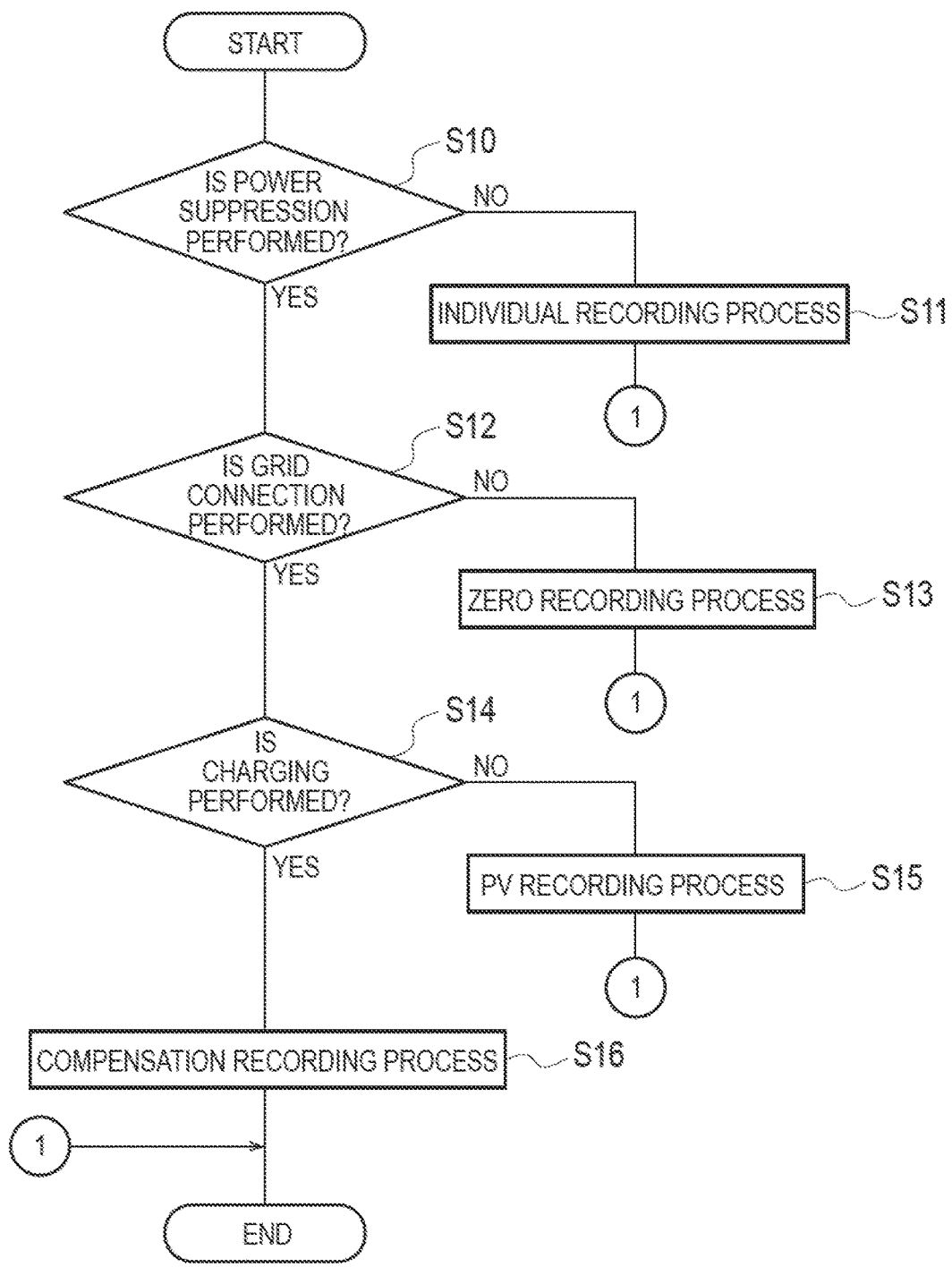
FIG. 13 is a flowchart illustrating a control method according to another embodiment.

A control method according to another embodiment will be described below. FIG. 13 is a flowchart illustrating the control method according to the other embodiment.

As illustrated in FIG. 13, in step S10, the PCS 130 determines whether or not the output of the solar cell 110 is suppressed according to the output suppression message. If a determination result is YES, the PCS 130 moves to a process of step S12. When the determination result is NO, the PCS 130 moves to a process of step S11.

In step S11, the PCS 130 outputs, as the power generation history, the output power of the solar cell 110 (power measured by the CT 21, for example), and outputs, as the charge/discharge history, the charge/discharge power of the storage battery 120 (power measured by the CT 22, for example). The power generation history and the charge/discharge history are recorded in the recording apparatus 500, similarly to the verification record (individual recording process).

Here, the output power of the solar cell 110 (power measured by the CT 21) may be corrected so that a total of the power measured by the CT 21 and the power measured by the CT 22 is power measured by the CT 23. Likewise, the charge/discharge power of the storage battery 120 (power measured by the CT 22) may be corrected so that a total of the power measured by the CT 21 and the power measured by the CT 22 is power measured by the CT 23.

In step S12, the PCS 130 determines whether or not the PCS 130 is operating in a mode in which the reverse power flow to the power grid side is performed. For example, the PCS 130 determines whether or not the operating state of the PCS 130 is a grid connected state. If a determination result is YES, the PCS 130 moves to a process of step S14. When the determination result is NO, the PCS 130 moves to a process of step S13.

In step S13, the controller 134 outputs zero as the verification record. The verification record is recorded in the recording apparatus 500 (zero recording process). Step S13 is an operation in the case of the above-described (d) self-sustained.

In step S14, the PCS 130 determines whether or not the storage battery 120 is charged. If a determination result is YES, the PCS 130 moves to a process of step S16. When the determination result is NO, the PCS 130 moves to a process of step S15.

In step S15, the PCS 130 outputs, as the verification record, the output power of the solar cell 110 (power measured by the CT 21), for example)). The verification record is recorded in the recording apparatus 500 (PV recording process). Step S15 is an operation in the case of the above-described (a) battery stopped and the (b) battery discharged.

Here, the output power of the solar cell 110 (power measured by the CT 21) may be corrected so that a total of the power measured by the CT 21 and the power measured by the CT 22 is power measured by the CT 23.

In step S16, the controller 134 outputs, as the verification record, a value obtained by subtracting the charge power of the storage battery 120 (power measured by the CT 22, for example) from the output power of the inverter 133 (power measured by the CT 23). The verification record is recorded in the recording apparatus 500 (compensation recording process). Step S16 is an operation in the case of the above-described (c) battery charged.

Here, the charge/discharge power of the storage battery 120 (power measured by the CT 22) may be corrected so that a total of the power measured by the CT 21 and the power measured by the CT 22 is the power measured by the CT 23.

(Operation and Effect)

In the other embodiment, in a case where the PCS 130 that converts the DC power input both from the solar cell 110 and the storage battery 120 to the AC power is used, the recording apparatus 500 records, as the verification record, the value obtained by subtracting the charge power of the storage battery 120 from the output power of the inverter when the storage battery 120 is charged.

Therefore, when the PCS 130 is controlled based on the record, it is less likely that the output of the solar cell 110 is excessively suppressed in spite of the reverse power flow to the power grid side being suppressed according to the output suppression message. As a result, while the reverse power flow to the power grid side is suppressed according to the output suppression message, it is possible to resolve the disadvantage of a user.

In the other embodiment, the power measured by the CT 21 (or the CT 22) is corrected so that a total of the power measured by the CT 21 and the power measured by the CT 22 is the power measured by the CT 23. Therefore, a loss of the inverter 133 is reflected in the verification record, and thus, it is possible to resolve a disadvantage of a user.

Another Embodiment

A modification of another embodiment will be described, below. Description proceeds with a particular focus on a difference from the above-described other embodiments, below.

Figure 14:
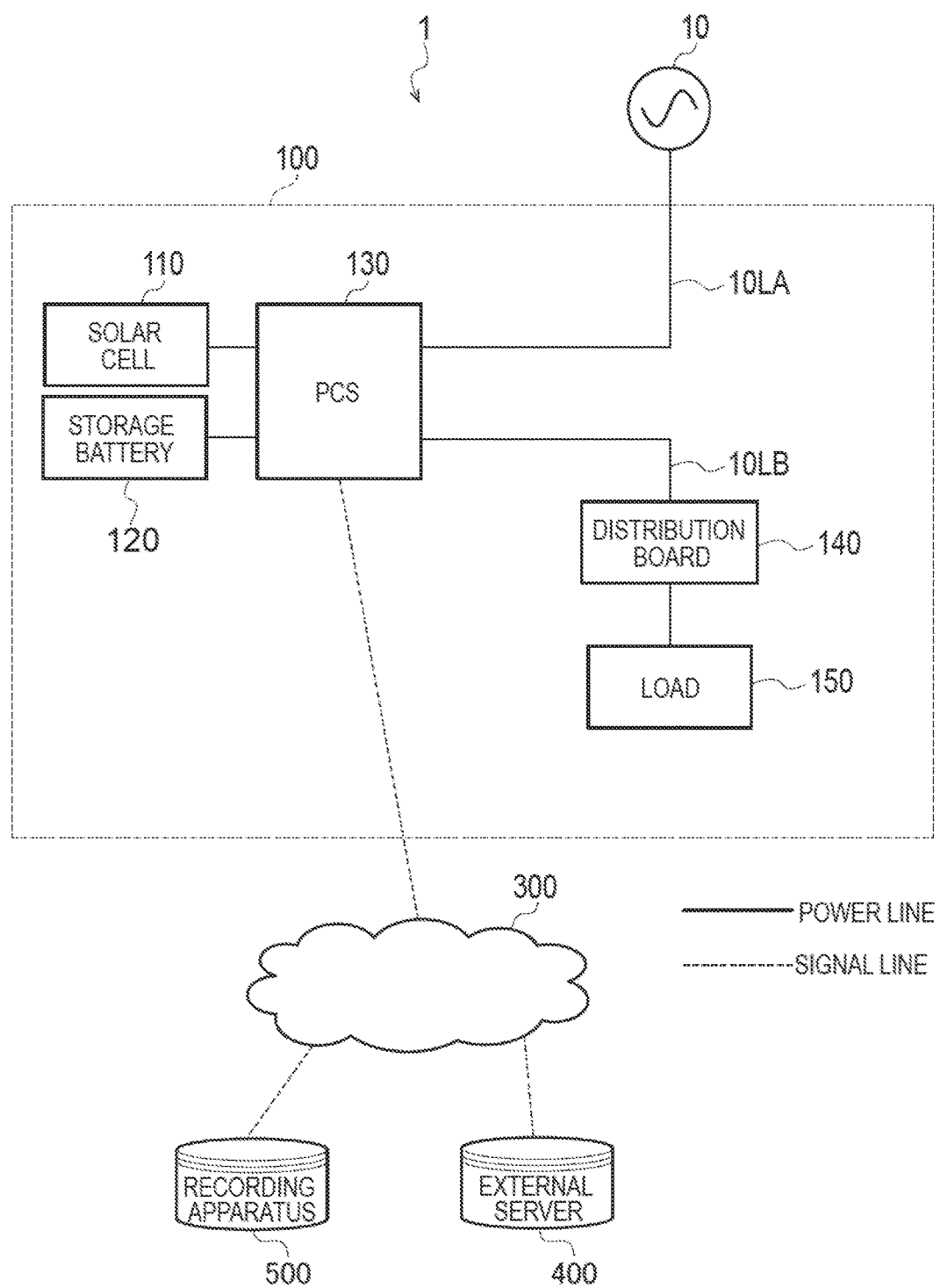
FIG. 14 is a diagram illustrating the power management system 1 according to another embodiment.

In the other embodiment, the consumer's facility 100 does not have the EMS 200 and the remote controller 210, as illustrated in FIG. 14. The PCS 130 (communication unit 135) is directly connected to the network 300, and communicates with the external server 400 and the recording apparatus 500.

Therefore, the PCS 130 (communication unit 135) transmits the verification record output from the controller 134 to the recording apparatus 500 while skipping the remote controller 210 and the EMS 200. The power generation history and the charge/discharge history are, similarly to the verification record, transmitted to the recording apparatus 500 without passing through the remote controller 210 and the EMS 200.

Another Embodiment

A modification of another embodiment will be described, below. Description proceeds with a particular focus on a difference from the above-described other embodiments, below.

Figure 15:
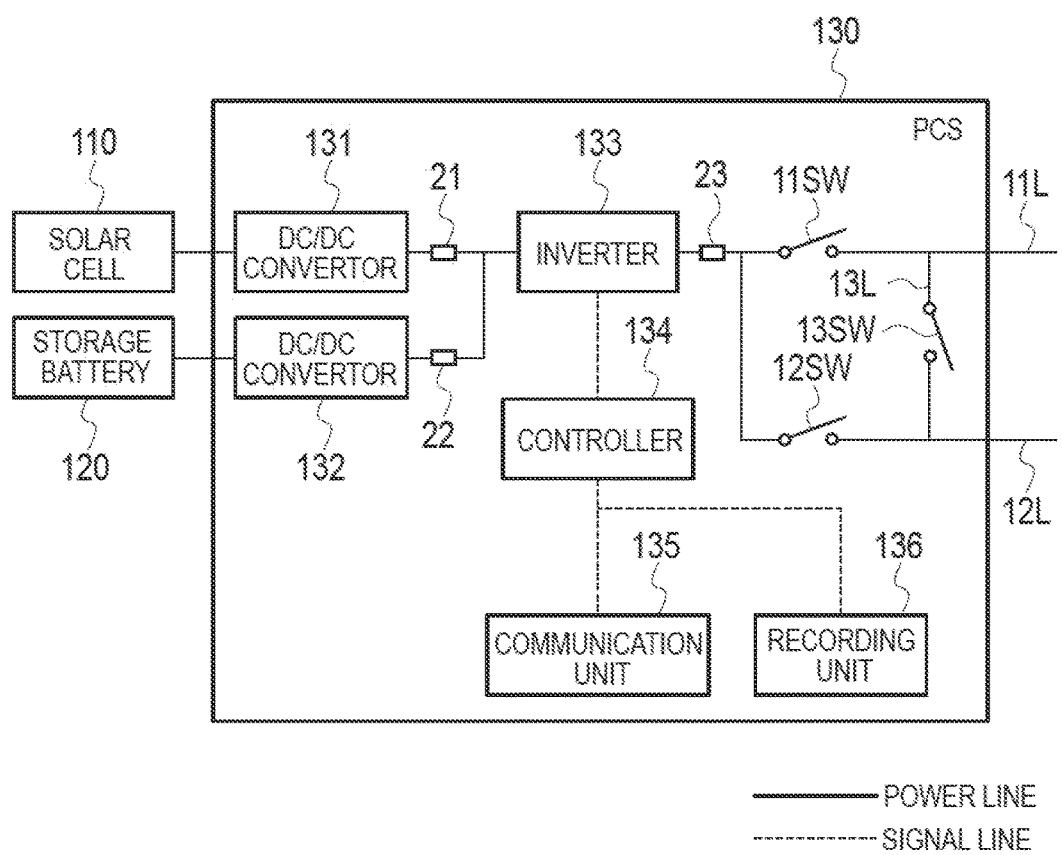
FIG. 15 is a diagram illustrating the PCS 130 according to another embodiment.

In the other embodiment, the PCS 130 includes the recording unit 136, as illustrated in FIG. 15. The recording unit 136 records, in much the same way as the recording apparatus 500, a verification record including whether or not the suppression of the output of the distributed power source is correctly executed according to the output suppression message. In such a case, the recording unit 136 may record the verification record output from the controller 134.

In the other embodiment, the recording unit 136 that records the verification record is provided in the PCS 130, and thus, the power management system 1 need not to include the recording apparatus 500.

Another Embodiment

A modification of another embodiment will be described, below. Description proceeds with a particular focus on a difference from the above-described other embodiments, below.

Figure 16:
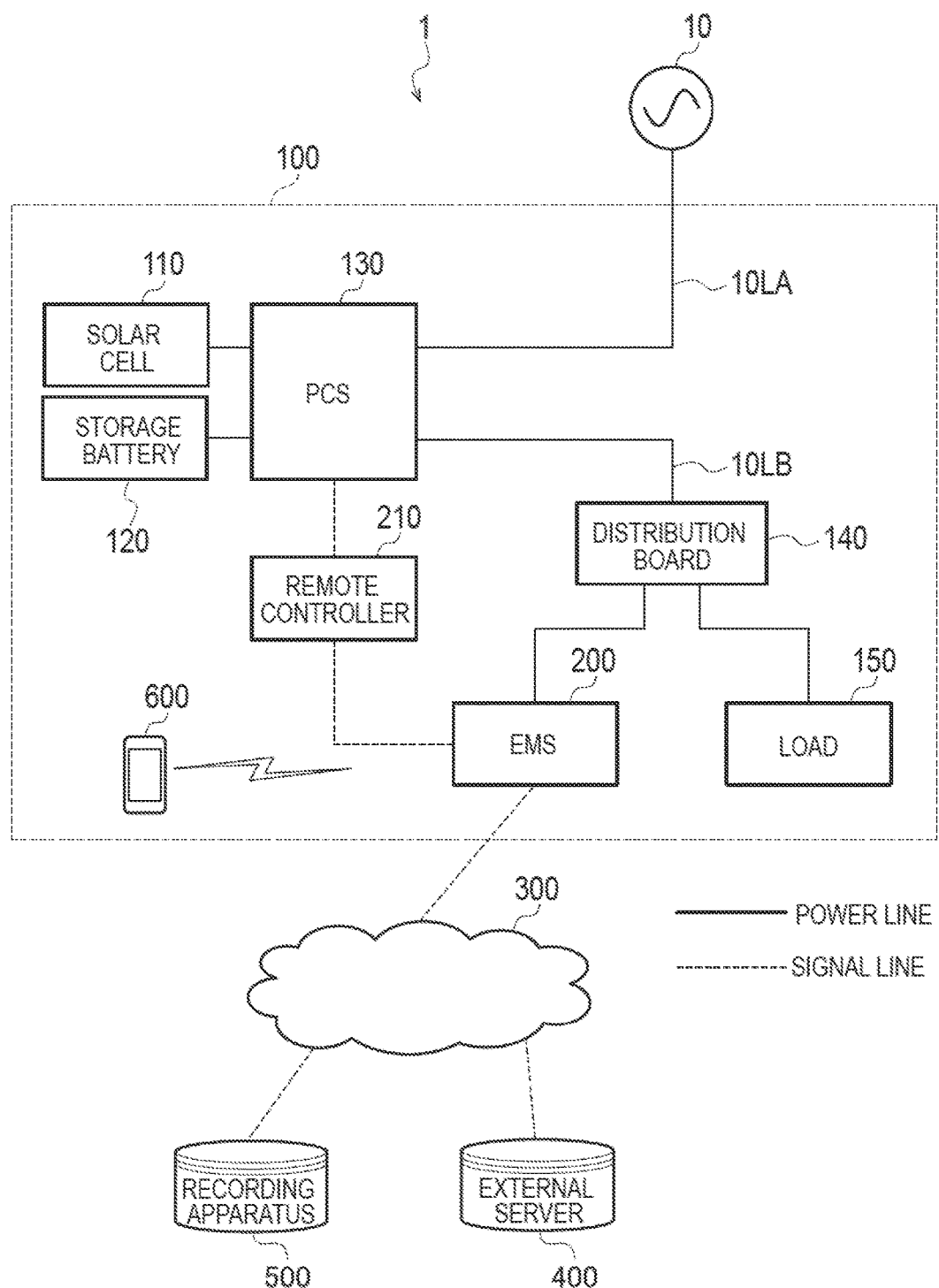
FIG. 16 is a diagram illustrating the power management system 1 according to another embodiment.

In the other embodiment, the power management system 1 includes a display apparatus 600 that individually displays the output power of the solar cell 110 and charge/discharge power of the storage battery 120, as illustrated in FIG. 16. The output power of the solar cell 110 is the power measured by the CT 21, for example. The power measured by the CT 21 may be corrected so that a total of the power measured by the CT 21 and the power measured by the CT 22 is the power measured by the CT 23. The charge/discharge power of the storage battery 120 is the power measured by the CT 22, for example. The power measured by the CT 22 may be corrected so that a total of the power measured by the CT 21 and the power measured by the CT 22 is the power measured by the CT 23.

The display apparatus 600 is a terminal such as a television, a liquid-crystal display, a smartphone, and a tablet. The display apparatus 600 performs communication with the PCS 130 to acquire the output power of the solar cell 110 and the charge/discharge power of the storage battery 120. Alternatively, the display apparatus 600 may perform communication with the recording apparatus 500 to acquire the output power of the solar cell 110 and the charge/discharge power of the storage battery 120. Alternatively, when the output power of the solar cell 110 and the charge/discharge power of the storage battery 120 are managed by the EMS 200, the display apparatus 600 may perform communication with the EMS 200 to acquire the output power of the solar cell 110 and the charge/discharge power of the storage battery 120.

Other Embodiments

The present invention was described in terms of the embodiment set forth above, the invention should not be understood to be limited by the statements and the drawings constituting a part of this disclosure. From this disclosure, various alternative embodiments, examples, and operational technologies will be obvious to those skilled in the art.

The embodiments provide an example of the solar cell 110 as the distributed power source to operate in accordance with the output suppression message. However, the distributed power source is not limited thereto. The distributed power source may be an equipment that utilizes a natural energy such as a wind power and a geothermal heat to generate power. Alternatively, the distributed power source may be a fuel cell that utilizes a fuel gas to produce power.

In the embodiments, the controller 134 controls the PCS 130. In such a case, the controller 134 may control the PCS 130 according to an instruction from the EMS 200 or the remote controller 210. That is, a controller which stops, when a condition for stopping the output of the distributed power source is satisfied, the operation of the first direct current convertor (functional block including a similar function to the controller 134) may be provided in the EMS 200 or the remote controller 210.

In the other embodiment, the recording unit 136 that records the verification record is provided in the PCS 130. However, the embodiment is not limited thereto. The recording unit 136 that records the verification record may be provided in the EMS 200 or the remote controller 210.

Further, when the amount of power stored in the storage battery 120 is lower than a predetermined value upon receipt of the message instructing the operation stop of the solar cell 110 (operation stop instruction), the power generated by the solar cell 110 may be stored in the storage battery 120, and then, the DC/DC convertor 131 may be stopped. When part of the power that cannot flow reversely is stored in the storage battery 120, it is possible to effectively use the generated power.

In addition, upon storage of the power generated by the solar cell 110 into the storage battery 120, the switch 11SW, the switch 12SW, and the switch 13SW may be operated so that the power generated in the main power line 10L does not flow reversely to thereby separate the PCS 130 from the power grid 10. As a result, it is possible to decrease a possibility that the power generated by the solar cell 110 flows reversely.

In the above-described embodiments, the case where the DC/DC convertor 131 only is stopped is described; however, the DC/DC convertor 132 may also be stopped. Further, when the DC/DC convertor 131 and the DC/DC convertor 132 are stopped, the DC/DC convertor 132 may be stopped with a difference in time (when a predetermine condition is satisfied) rather than the both converters are stopped simultaneously.

In the other embodiments, the CT 21, the CT 22, and the CT 23 are provided in the PCS 130. However, the other embodiments are not limited thereto. At least one or more measuring instruments, out of the CT 21, the CT 22, and the CT 23, may be provided outside the PCS 130.

In the other embodiments, the verification record, the power generation history, and the charge/discharge history are generated by the PCS 130 and output from the PCS 130. However, the other embodiments are not limited thereto. The verification record, the power generation history, and the charge/discharge history may be generated by the EMS 200 or the remote controller 210 and output from the EMS 200 or the remote controller 210. In such a case, the EMS 200 or the remote controller 210 are connected to the CT 21, the CT 22, and the CT 23.

Thus, in a case where a subject that acquires the power value from the CT 21, the CT 22, and the CT 23 (that is, a subject that generates the verification record) is an equipment other than the PCS 130, the PCS 130 may transmit a message indicating that the PCS 130 is the equipment to generate the verification record according to the other embodiments, to the subject that acquirers the power value from the CT 21, the CT 22, and the CT 23. Such a message notification may be performed by a power line communication (PLC) or by communication in which a wireless LAN or a wired LAN is used.

In the other embodiments, the subject that corrects the power measured by the CT 21 (and the CT 22) so that a total of the power measured by the CT 21 and the power measured by the CT 22 is the power measured by the CT 23 is the controller 134 of the PCS 130. However, the other embodiments are not limited thereto. The subject that performs such a correction may be the EMS 200, the remote controller 210, or the recording apparatus 500.

The entire contents of PCT Application No. PCT/JP2016/055702 (filed on Feb. 25, 2016), which claims priority to and the benefit of Japanese patent application No. 2015-035910 (filed on Feb. 25, 2015) and Japanese patent application No. 2015-035914 (filed on Feb. 25, 2015) are incorporated herein by reference.

The invention claimed is:

1. A power converting apparatus comprising:
a first direct current convertor that converts a voltage of a DC (Direct Current) power input from a first distributed power source;
an inverter that converts the DC power input from the first direct current convertor to an AC (Alternating Current) power; and
a controller that stops an operation of the first direct current convertor without stopping the inverter when a condition that stops an output of the first distributed power source is satisfied,
wherein the condition that stops the output of the first distributed power source is a condition that communication between an external server and the power converting apparatus is disconnected.

2. The power converting apparatus according to claim 1, wherein the first distributed power source is capable of passing the power output from the first distributed power source, from a consumer's facility in which the first distributed power source is installed to a power grid side.

3. The power converting apparatus according to claim 1 comprising:
a second direct current convertor that converts a voltage of a DC power input from a second distributed power source,
wherein the inverter converts the DC power input from the second direct current convertor to an AC power.

4. The power converting apparatus according to claim 3, wherein the second distributed power source is capable of passing the power output from the second distributed power source, from a consumer's facility in which the second distributed power source is installed to a power grid side.

5. The power converting apparatus according to claim 3, wherein the controller stops the operation of the first direct current convertor and does not stop an operation of the second direct current convertor when the condition that stops the output of the first distributed power source is satisfied.

6. The power converting apparatus according to claim 3, wherein the controller does not stop the operation of the inverter and stops the operation of the first direct current convertor.

7. The power converting apparatus according to claim 3, wherein the second distributed power source is a storage battery, the controller outputs a verification record including whether or not a suppression of the output of the distributed power source is correctly executed, and the controller outputs, as the verification record, a value obtained by subtracting a charge power of the storage battery from an output power of the inverter, when the storage battery is charged.

8. The power converting apparatus according to claim 1, wherein the condition that stops the output of the first distributed power source is a condition that the controller receives from a control apparatus present between the power converting apparatus and the external server a message indicating that the disconnection of the communication between the control apparatus and the external server is detected.

9. The power converting apparatus according to claim 1, comprising:
a remote controller capable of transmitting to the control apparatus a message for operating the power converting apparatus, the remote controller being connected to the control apparatus present between the power converting apparatus and the external server, wherein the condition that stops the output of the first distributed power source is a condition that the controller receives from the remote controller a message indicating that disconnection of communication between the remote controller and the control apparatus is detected.

10. A power converting apparatus comprising:
a first direct current convertor that converts a voltage of a DC (Direct Current) power input from a first distributed power source;
an inverter that converts the DC power input from the first direct current convertor to an AC (Alternating Current) power; and
a controller that stops an operation of the first direct current convertor without stopping the inverter when a condition that stops an output of the first distributed power source is satisfied,
wherein the condition that stops the output of the first distributed power source is a condition that an output suppression message instructing a stop of an output of the distributed power source is received.

11. A power converting apparatus comprising:
a first direct current convertor that converts a voltage of a DC (Direct Current) power input from a first distributed power source;
an inverter that converts the DC power input from the first direct current convertor to an AC (Alternating Current) power; and
a controller that stops an operation of the first direct current convertor without stopping the inverter when a condition that stops an output of the first distributed power source is satisfied,
wherein the controller automatically starts the operation of the first direct current convertor when the condition that stops the output of the first distributed power source is not satisfied any more.

12. A power converting apparatus comprising:
a first direct current convertor that converts a voltage of a DC (Direct Current) power input from a first distributed power source;
an inverter that converts the DC power input from the first direct current convertor to an AC (Alternating Current) power; and
a controller that stops an operation of the first direct current convertor without stopping the inverter when a condition that stops an output of the first distributed power source is satisfied,
wherein the controller does not automatically start the operation of the first direct current convertor when the condition that stops the output of the first distributed power source is not satisfied any more.

13. A power converting apparatus comprising:
a first direct current convertor that converts a voltage of a DC (Direct Current) power input from a first distributed power source;
an inverter that converts the DC power input from the first direct current convertor to an AC (Alternating Current) power; and
a controller that stops an operation of the first direct current convertor without stopping the inverter when a condition that stops an output of the first distributed power source is satisfied,
wherein the controller outputs a verification record including whether or not a suppression of the output of the distributed power source is correctly executed, and the controller outputs zero as the verification record when the operation of the first direct current convertor is stopped.

14. The power converting apparatus according to claim 13, wherein the controller outputs zero as the verification record when the power converting apparatus does not operate in a mode in which a reverse power flow to a grid side is performed.

15. A power converting method for a power converting apparatus, comprising:
(A) converting a voltage of a DC power input from a first distributed power source by a first direct current convertor;
(B) converting the DC power converted in the (A) to an AC power by an inverter; and
(C) stopping an operation of the first direct current convertor when a condition that stops an output of the first distributed power source is satisfied,
wherein the condition that stops the output of the first distributed power source is a condition that communication between an external server and the power converting apparatus is disconnected.

* * * * *